United States Patent Office 3,378,502
Patented Apr. 16, 1968

3,378,502
PROCESS FOR PREPARING POLYMERS OF CYCLIC ACETALS USING COMPLETELY ESTERIFIED POLYPHOSPHORIC ACID CATALYST
Hans Fernholz, Bad Soden, Taunus, and Friedrich Wunder, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 21, 1964, Ser. No. 361,555
Claims priority, application Germany, Apr. 30, 1963, F 39,625
6 Claims. (Cl. 260—2)

ABSTRACT OF THE DISCLOSURE

A process in which completely esterified polyphosphoric acid or completely esterified polyphosphoric acid containing phosphite is used as a catalyst in the cationic homopolymerization and copolymerization of cyclic acetals.

---

The present invention relates to polymers and copolymers of cyclic acetals and to a process for preparing them.

It is known that cyclic acetals can be polymerized in the presence of cationic catalysts. The polymerization of trioxane, by which products are obtained that are manufactured into plastics having various possible uses, is of special importance. Besides inorganic acids such as sulfuric acid, phosphoric acid or perchloric acid, there have particularly been used as catalysts up to now Friedel-Crafts catalysts, or Lewis acids such as boron trifluoride and its complex compounds, heavy metal fluorides and compounds having an active halogen atom. It is, however, known that polyacetals are decomposed by acids and that under certain conditions also the aforesaid polymerization catalysts may cause such an acidolysis of the polyacetals. Therefore, the use of acid catalysts may entail disadvantages and require certain precautions. It has consequently been proposed to use salts of perhalogen acids as catalysts, for example. However, these catalysts have proved of little efficiency. They require long polymerization periods or lead to the formation of polymers having a low molecular weight.

Now we have found a process for preparing polyacetals wherein cyclic acetals are polymerized, if desired together with other polymerizable compounds, in the presence or absence of inert solvents at a temperature of $-70°$ C. to $+150°$ C., and in the presence of completely esterified polyphosphoric acid which may additionally contain phosphite.

In their catalytic activity, the completely esterified polyphosphoric acids used as catalysts are superior to acid polyphosphoric acid esters which may be prepared for example by reacting diphosphorus pentoxide with an alcohol.

The process according to the present invention has many advantages in comparison with the known processes. In particular the polymers obtained are inert towards the completely esterified polyphosphoric acids and no decomposition by acidolysis takes place. It is unnecessary for this reason to neutralize or to destroy the catalyst immediately after the polymerization is finished and therefore the process is considerably simplified. The polyacetals prepared according to the process of the present invention are also distinguished by a good thermal stability. A further advantage of the process according to the present invention is that the catalysts used are uniformly distributed in the monomer in spite of their high activity and that they thus enable the polymerization to be carried out in a uniform manner. There are obtained therefore very uniform and pure polymers having a high molecular weight.

The catalysts according to the present invention can be prepared in various manners. The easiest way of prepare them is to react diphosphorus pentoxide with completely esterified ortho-phosphoric acid or phosphorus acid such as trimethyl, triethyl, tripropyl, tributyl, triphenyl or tricresyl phosphates and/or dimethyl, diethyl or dipropyl phosphites. For carrying out the process according to the present invention there are also appropriated as catalysts the neutral polyphosphoric acid esters prepared by reacting diphosphorus pentoxide with an ether or by reacting phosphorus oxychloride with an alcohol or a completely esterified phosphoric acid. The phosphorus content is of decisive importance for the activity of the catalysts according to the present invention. The polyphosphoric acid ester used as catalyst advantageously contains at least 0.01 mol diphosphorus pentoxide per mol of neutral ester having one phosphorus atom in the molecule. It is not possible to indicate a precise upper limit for the phosphorus content, since it substantially depends on the method of preparation and the kind of starting components. When diphosphorus pentoxide is reacted with triethyl phosphate, the quantitative ratio is approximately 100 parts by weight diphosphorus pentoxide to 100 parts by weight triethyl phosphate, which corresponds to about 1.3 mols diphosphorus pentoxide per 1 mol triethyl phosphate. It is advantageous to use as starting materials alkyl or aryl esters, such as trimethyl or triethyl phosphate or diethyl phosphite, for preparaing the catalyst.

For the polymerization according to the process of the present invention, all cyclic acetals known to be polymerizable are appropriate, either alone or in admixture with other polymerizable monomers. There may be mentioned for example trioxane, glycol formal, 4-chloromethyl-1,3-dioxolane, digylcol formal, 1,4-butane diol formal. The aforesaid compounds may also be used together with $\beta$-lactones such as for example $\beta$-propiolactone.

The catalysts of the present invention may be used as such or dissolved in an inert solvent, preferably in the solvent in which the polymerization is carried out, in concentrations of 0.001–5% by weight, calculated on the monomer.

The polymerization may be carried out in the presence or in the absence of a solvent or diluent or suspension medium. The following inert media are suitable, for example: aliphatic, cycloaliphatic, aromatic and halogenated hydrocarbons. The process according to the present invention is carried out at temperatures customary in the polymerization of acetals, i.e. at $-70°$ C. to $+150°$ C., preferably 20–80° C.

The properties of the products prepared according to the present invention and particularly their molecular weights depend on the polymerization conditions, i.e. on the catalyst concentration, on the reaction temperature chosen on the solvent etc.

The polymers prepared according to the process of the present invention can be manufactured into shaped articles of all kinds and, besides being customarily used as thermoplastics, they are suitable because of their high tenacity, hardness and the nature of their surface as a substitute for metals in bearings, springs, armatures, door handles etc.

The following examples serve to illustrate the invention but they are not intended to limit it thereto.

Example 1

100 parts by weight liquid trioxane pure for the purpose of polymeriztion were heated to 70° C. and mixed with 0.01 part by weight ethyl polyphosphate prepared from 100 g. diphosphorus pentoxide and 100 g. triethyl phosphate (dissolved in 0.1 part by weight chloroform). The maximum temperature of 130° C. was attained after 20 minutes. Polymerization was interrupted after 2 hours, the polymer block was ground and boiled for 1 hour with 200 g. methanol and 2 g. triethanol amine. After drying, 80.5 g. polymer were obtained which had a reduced viscosity of 0.91 measured in a 0.5% solution in butyrolactone at 140° C.

Example 2

100 parts by weight liquid trioxane pure for the purpose of polmerization were heated to 70° C. in the oil bath and subsequently mixed with 0.02 part by weight ethyl polyphosphate. After 15 minutes the maximum temperature of 140° C. was attained. Polymerization was interrupted after 2 hours, the polymer block was ground, boiled for 1 hour with 200 parts by weight methanol and 2 parts by weight ethanol amine and dried. Yield: 97 parts by weight polymer. The polymer had a reduced viscosity of 0.77 measured in a 0.5% solution of butyrolactone at 140° C.

Example 3

100 parts by weight liquid trioxane pure for the purpose of polymerization were heated to 70° C. in the oil bath and 0.05 part by weight cresyl polyphosphate prepared from 25 g. diphosphorus pentoxide and 100 g. tricresyl phosphate were admixed. The maximum temperature of 135° C. was attained after 10 minutes and polymerization was interrupted after 80 minutes. The polymer was further treated as described in Examples 1 and 2 and there were obtained 89 parts by weight polymer having a reduced viscosity of 0.81.

Example 4

100 parts by weight liquid trioxane pure for the purpose of polymerization were dissolved in 200 parts by weight methylene chloride, cooled to 20° C. and mixed with 0.1 part by weight ethyl polyphosphate prepared from 100 g. diphosphorus pentoxide and 100 g. triethyl phosphate and also dissolved in 1 part by weight methylene chloride. After 5 hours the polymer that had formed was vacuum filtered and further treated as described in Example 1. Yield: 76 parts by weight polymer having a reduced viscosity of 0.86.

Example 5

100 parts by weight liquid trioxane pure for the purpose of polymerization were dispersed in 200 parts by weight boiling hexane while vigorously stirring, mixed with 0.02 part by weight ethyl polyphosphate prepared from 100 g. diphosphorus pentoxide and 100 g. triethyl phosphate, and vigorously stirred for 2 hours. Then the polymer was vacuum filtered, further treated as described in Example 1 and dried. Yield: 83 parts by weight polymer having a reduced viscosity of 0.78.

Example 6

100 parts by weight very pure trioxane were suspended in 200 parts by weight boiling butane and mixed with 0.3 part by weight ethyl polyphosphate prepared from 100 g. diphosphorus pentoxide and 100 g. triethyl phosphate. The polymer was vacuum filtered after 5 hours and further treated as described in Example 1 and dried. Yield: 64 parts by weight polymer having a reduced viscosity of 0.87.

Example 7

96 parts by weight liquid trioxane pure for the purpose of polymerization were mixed with 4 parts by weight glycol formal (dioxolane), heated to 70° C. in the oil bath and mixed with 0.02 part by weight ethyl polyphosphate prepared from 100 g. diphosphorus pentoxide and 100 g. triethyl phosphate. The polymer block was ground after 2 hours and further treated as described in Example 1. Yield: 76 g. polymer having a reduced viscosity of 0.81.

Example 8

Liquid trioxane was maintained slightly boiling under nitrogen for 2 hours over lithium aluminum hydride and subsequently was distilled off from the mixture. 100 parts by weight of this freshly distilled trioxane were heated to 70° C. in an oil bath and mixed with 0.005 part by weight ethyl polyphosphate prepared from 100 g. diphosphorus pentoxide and 100 g. triethyl phosphate dissolved in 0.1 part chloroform. After 75 minutes the maximum temperature of 75° C. was attained and the polymerization was interrupted after 3 hours. The polymer was further treated and its viscosity measured as described in Example 1. Yield: 57 parts by weight polymer having a reduced viscosity of 2.2.

Example 9

50 parts by weight diethylene glycol formal were mixed under an inert atmosphere and while stirring with 0.1 part ethyl polyphosphate prepared from 100 g. diphosphorus pentoxide and 100 g. triethyl phosphate. After a few minutes the temperature of the batch rose to 70° C. The polymer was dissolved after 5 hours in acetone and 1% triethanol amine, it was precipitated with petroleum ether, washed and dried in vacuo at 40° C. Yield: 80% polymer having a reduced viscosity 0.34.

Example 10

In the manner described in Example 9, 50 parts by weight 1,4-butane diol formed were polymerized with 0.05 part by weight ethyl polyphosphate prepared from 100 g. diphosphorus pentoxide and 100 g. triethyl phosphate. The polymer was further treated by dissolving it in benzyl alcohol in the presence of triethenol amine, by precipitating it with methanol, washing it with methanol and water and drying it at 60° C. in vacuo. Yield: 85% polymer having a reduced viscosity 0.48.

Example 11

Liquid trioxane was maintained slightly boiling for 2 hours under nitrogen and over lithium aluminium hydride, and subsequently was distilled off from the mixture 100 parts by weight of this freshly distilled trioxane were heated to 70° C. in an oil bath and mixed with 0.005 part by weight of a compound prepared from 100 g. diphosphorus pentoxide and 100 g. diethyl phosphite and dissolved in 0.1 part methylene chloride. The maximum temperature of 75° C. was attained after 120 minutes, and after 3 hours the polymerization was interrupted. The polymer was further treated and the viscosity was measured as described in Example 1. Yield: 36 parts by weight polymer having a reduced viscosity of 2.6.

We claim:

1. In a process for polymerizing cyclic acetals and mixtures of cyclic acetals with compounds polymerizable therewith at temperatures of −70° C. to 150° C. in the presence of a cationic catalyst, the improvement wherein said catalyst is selected from the group consisting of completely esterified polyphosphoric acid and completely esterified polyphosphoric acid containing phosphite, said completely esterified polyphosphoric acid containing at least 0.01 mol of diphosphorus pentoxide per mol of monophosphoric acid ester therein.

2. A process as in claim 1 wherein said catalyst is present in an amount of 0.001 to 5 percent by weight of monomer polymerized.

3. A process as in claim 1 wherein trioxane is polymerized.

4. A process as in claim 1 wherein dioxolane is polymerized.

5. A process as in claim 1 wherein 1,4-butane diol formal is polymerized.

6. A proces as in claim 1 wherein diethylene glycol formal is polymerized.

References Cited

UNITED STATES PATENTS

| 2,614,136 | 10/1952 | Kolfenbach et al. | 260—683.15 |
| 2,989,511 | 6/1961 | Schnizer | 260—67 |
| 3,272,780 | 9/1966 | Wilson et al. | 260—73 |

FOREIGN PATENTS

| 342,668 | 3/1931 | Great Britain. |

WILLIAM H. SHORT, *Primary Examiner.*

SAMUEL H. BLECH, *Examiner.*

L. M. PHYNES, *Assistant Examiner.*